(12) United States Patent
Kang et al.

(10) Patent No.: US 9,403,991 B2
(45) Date of Patent: Aug. 2, 2016

(54) HARD COATING COMPOSITION

(71) Applicant: LG CHEM, LTD., Seoul (KR)

(72) Inventors: Joon Koo Kang, Daejeon (KR); Yeong Rae Chang, Daejeon (KR); Jae Hoon Shim, Daejeon (KR); Sung Don Hong, Daejeon (KR); Seung Jung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/404,304

(22) PCT Filed: May 31, 2013

(86) PCT No.: PCT/KR2013/004809
§ 371 (c)(1),
(2) Date: Nov. 26, 2014

(87) PCT Pub. No.: WO2013/180512
PCT Pub. Date: Dec. 5, 2013

(65) Prior Publication Data
US 2015/0148443 A1    May 28, 2015

(30) Foreign Application Priority Data

| May 31, 2012 | (KR) | 10-2012-0058634 |
|---|---|---|
| May 31, 2012 | (KR) | 10-2012-0058635 |
| May 31, 2012 | (KR) | 10-2012-0058636 |
| May 31, 2012 | (KR) | 10-2012-0058637 |
| May 30, 2013 | (KR) | 10-2013-0062094 |

(51) Int. Cl.
| C08F 2/50 | (2006.01) |
|---|---|
| C08F 2/46 | (2006.01) |
| C08G 61/04 | (2006.01) |
| C09D 4/00 | (2006.01) |
| C09D 133/04 | (2006.01) |
| G02B 1/10 | (2015.01) |
| C08K 5/3475 | (2006.01) |
| C09D 7/12 | (2006.01) |
| C09D 135/02 | (2006.01) |
| C09D 105/16 | (2006.01) |
| C09D 133/14 | (2006.01) |
| C09D 167/00 | (2006.01) |
| C08J 7/04 | (2006.01) |
| B05D 3/06 | (2006.01) |
| C08K 3/36 | (2006.01) |
| C08K 3/22 | (2006.01) |

(52) U.S. Cl.
CPC *C09D 4/00* (2013.01); *B05D 3/067* (2013.01); *C08J 7/042* (2013.01); *C08J 7/047* (2013.01); *C08K 5/3475* (2013.01); *C09D 7/1216* (2013.01); *C09D 7/1241* (2013.01); *C09D 105/16* (2013.01); *C09D 133/04* (2013.01); *C09D 133/14* (2013.01); *C09D 135/02* (2013.01); *C09D 167/00* (2013.01); *G02B 1/105* (2013.01); *C08J 2301/12* (2013.01); *C08J 2367/02* (2013.01); *C08J 2433/14* (2013.01); *C08J 2435/02* (2013.01); *C08K 3/36* (2013.01); *C08K 2003/2227* (2013.01); *C08K 2003/2241* (2013.01); *C08K 2003/2296* (2013.01); *C08K 2201/005* (2013.01); *C08K 2201/011* (2013.01); *Y10T 428/2495* (2015.01); *Y10T 428/259* (2015.01); *Y10T 428/269* (2015.01); *Y10T 428/31507* (2015.04); *Y10T 428/31797* (2015.04); *Y10T 428/31884* (2015.04); *Y10T 428/31928* (2015.04)

(58) Field of Classification Search
CPC .. C09D 133/14; C09D 167/00; C09D 105/16; C09D 133/04; C09D 7/1216; C09D 135/02; C09D 4/00; B05D 3/067; C08K 3/36; C08K 5/3475; C08J 7/042; C08J 5/18; C08J 2435/02; C08J 7/04; C08J 2367/02; G02B 1/105
USPC .............. 522/64, 6, 71, 189, 184, 1; 520/1
See application file for complete search history.

(56) References Cited

U.S. PATENT DOCUMENTS

| 6,245,833 | B1 | 6/2001 | Kang et al. |
|---|---|---|---|
| 7,622,055 | B2 | 11/2009 | Nakano et al. |
| 2004/0081831 | A1 | 4/2004 | Shoshi et al. |
| 2005/0136273 | A1 | 6/2005 | Hashimoto et al. |
| 2006/0134400 | A1 | 6/2006 | Takada et al. |
| 2006/0234035 | A1 | 10/2006 | Wang et al. |
| 2006/0286383 | A1* | 12/2006 | Gilmer ............ C08F 222/1006 428/412 |
| 2007/0178297 | A1 | 8/2007 | Takada et al. |
| 2007/0237966 | A1 | 10/2007 | Takao et al. |
| 2008/0145673 | A1 | 6/2008 | Bonnard |

(Continued)

FOREIGN PATENT DOCUMENTS

| CN | 1558824 A | 12/2004 |
|---|---|---|
| CN | 1611968 A | 5/2005 |

(Continued)

OTHER PUBLICATIONS

Search Report issued in International Application No. PCT/KR2013/004809 dated Aug. 12, 2013, 5 pages.

(Continued)

*Primary Examiner* — Ling Choi
*Assistant Examiner* — Jessica E Whiteley
(74) *Attorney, Agent, or Firm* — Rothwell, Figg, Ernst & Manbeck, P.C.

(57) ABSTRACT

The present invention relates to a hard coating composition, and, more particularly, to a hard coating composition used in forming a hard coating film exhibiting high hardness and excellent properties. The hard coating composition can be used to form a high-hardness hard coating film that is not easily curled.

17 Claims, No Drawings

(56) References Cited

U.S. PATENT DOCUMENTS

| | | |
|---|---|---|
| 2008/0193722 A1 | 8/2008 | Tanaka |
| 2008/0218666 A1 | 9/2008 | Toyooka |
| 2008/0311351 A1 | 12/2008 | Hsu et al. |
| 2009/0169896 A1 | 7/2009 | Sohn et al. |
| 2009/0214871 A1* | 8/2009 | Fukuda et al. ........... C09D 4/00 428/413 |
| 2009/0301561 A1 | 12/2009 | Wang et al. |
| 2010/0084037 A1 | 4/2010 | Ericsson et al. |
| 2010/0124631 A1 | 5/2010 | Horio et al. |
| 2010/0124656 A1 | 5/2010 | Horio et al. |
| 2010/0167068 A1 | 7/2010 | Horio |
| 2011/0050623 A1 | 3/2011 | Lee et al. |
| 2011/0124823 A1 | 5/2011 | Hayashi et al. |
| 2012/0019766 A1 | 1/2012 | Oki et al. |
| 2012/0034450 A1 | 2/2012 | Morita et al. |

FOREIGN PATENT DOCUMENTS

| | | |
|---|---|---|
| CN | 1286640 C | 11/2006 |
| CN | 1898341 A | 1/2007 |
| CN | 1934140 A | 3/2007 |
| CN | 101701129 A | 5/2010 |
| CN | 102105515 A | 6/2011 |
| CN | 102257087 A | 11/2011 |
| EP | 0323560 A2 | 7/1989 |
| EP | 0442305 A2 | 8/1991 |
| EP | 0699704 A1 | 3/1996 |
| EP | 1162246 A1 | 12/2001 |
| EP | 2 840 109 A1 | 2/2015 |
| EP | 2 840 110 A1 | 2/2015 |
| EP | 2840107 A1 | 2/2015 |
| EP | 2 842 989 A1 | 3/2015 |
| EP | 2843008 A1 | 3/2015 |
| EP | 2857440 A1 | 4/2015 |
| JP | 2000-015734 A | 1/2000 |
| JP | 2000-071392 A | 3/2000 |
| JP | 2000-103887 A | 4/2000 |
| JP | 2000-214791 A | 8/2000 |
| JP | 2000-286179 A | 10/2000 |
| JP | 2000-293895 A | 10/2000 |
| JP | 2001-205179 A | 7/2001 |
| JP | 2001-323087 A | 11/2001 |
| JP | 2002-338720 A | 11/2002 |
| JP | 2005-053094 A | 3/2005 |
| JP | 2005-343119 A | 12/2005 |
| JP | 2006-051781 A | 2/2006 |
| JP | 2007-262281 A | 10/2007 |
| JP | 2007-313872 A | 12/2007 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008-116596 A | 5/2008 |
| JP | 2008-138165 A | 6/2008 |
| JP | 2008-150484 A | 7/2008 |
| JP | 2008-156387 A | 7/2008 |
| JP | 2008-165041 A | 7/2008 |
| JP | 2008-310286 A | 12/2008 |
| JP | 2009-204725 A | 9/2009 |
| JP | 2009-204727 A | 9/2009 |
| JP | 2009-241458 A | 10/2009 |
| JP | 2010-017991 A | 1/2010 |
| JP | 2010-052334 A | 3/2010 |
| JP | 2010-053231 A | 3/2010 |
| JP | 2010-085985 A | 4/2010 |
| JP | 2010-121013 A | 6/2010 |
| JP | 4496424 B2 | 7/2010 |
| JP | 2010-173234 A | 8/2010 |
| JP | 2010-284910 A | 12/2010 |
| JP | 2011-022456 A | 2/2011 |
| JP | 2011-031457 A | 2/2011 |
| JP | 2011-031527 A | 2/2011 |
| JP | 2011-504828 A | 2/2011 |
| JP | 2011-075705 A | 4/2011 |
| JP | 2011-093290 A | 5/2011 |
| JP | 2011-145593 A | 7/2011 |
| JP | 2011-148181 A | 8/2011 |
| JP | 2011-178910 A | 9/2011 |
| JP | 2011-183561 A | 9/2011 |
| JP | 2011-201087 A | 10/2011 |
| JP | 2011-225846 A | 11/2011 |
| JP | 2012-027401 A | 2/2012 |
| JP | 2012-063577 A | 3/2012 |
| JP | 2012-066477 A | 4/2012 |
| JP | 2012-072235 A | 4/2012 |
| JP | 4911474 B2 | 4/2012 |
| JP | 2013-095108 A | 5/2013 |
| KP | 10-2010-0132786 A | 12/2010 |
| KR | 10-1998-0020031 A | 3/1999 |
| KR | 10-1999-0072670 A | 9/1999 |
| KR | 10-2000-0021805 A | 4/2000 |
| KR | 10-2000-0021806 A | 4/2000 |
| KR | 10-0867338 B1 | 9/2000 |
| KR | 10-2002-0008267 A | 1/2002 |
| KR | 10-2004-0037081 A | 5/2004 |
| KR | 10-2004-0076422 A | 9/2004 |
| KR | 10-2004-0083916 A | 10/2004 |
| KR | 10-2004-0097189 A | 11/2004 |
| KR | 10-2006-0009194 A | 1/2006 |
| KR | 10-2007-0039742 A | 4/2007 |
| KR | 10-0730414 B1 | 6/2007 |
| KR | 10-0735894 B1 | 6/2007 |
| KR | 10-2007-0098560 A | 10/2007 |
| KR | 10-2007-0111352 A | 11/2007 |
| KR | 10-2008-0005839 A | 1/2008 |
| KR | 10-2008-0055698 A | 6/2008 |
| KR | 10-0852562 B1 | 8/2008 |
| KR | 10-2008-0109658 A | 12/2008 |
| KR | 10-2009-0020106 A | 2/2009 |
| KR | 10-0884079 B1 | 2/2009 |
| KR | 10-2009-0044089 A | 5/2009 |
| KR | 10-2009-0063182 A | 6/2009 |
| KR | 10-0905683 B1 | 6/2009 |
| KR | 10-2009-0073668 A | 7/2009 |
| KR | 10-0926220 B1 | 11/2009 |
| KR | 10-2010-0019661 A | 2/2010 |
| KR | 10-0945063 B1 | 2/2010 |
| KR | 10-2010-0026012 A | 3/2010 |
| KR | 10-2010-0026014 A | 3/2010 |
| KR | 10-2010-0037519 A | 4/2010 |
| KR | 10-2010-041992 A | 4/2010 |
| KR | 10-2010-0045997 A | 5/2010 |
| KR | 10-2010-0055160 A | 5/2010 |
| KR | 10-2010-0077798 A | 7/2010 |
| KR | 10-2010-0098320 A | 9/2010 |
| KR | 10-2010-0121281 A | 11/2010 |
| KR | 10-2010-0124477 A | 11/2010 |
| KR | 10-2010-0129512 A | 12/2010 |
| KR | 10-2010-0130367 A | 12/2010 |
| KR | 10-2009-0061821 A | 1/2011 |
| KR | 10-2011-0034324 A | 4/2011 |
| KR | 10-2011-0037622 A | 4/2011 |
| KR | 10-2011-0047596 A | 5/2011 |
| KR | 10-2011-0058743 A | 6/2011 |
| KR | 10-2011-0071480 A | 6/2011 |
| KR | 10-1058395 B1 | 8/2011 |
| KR | 10-2011-0103885 A | 9/2011 |
| KR | 10-2011-0104663 A | 9/2011 |
| KR | 10-2011-0130142 A | 12/2011 |
| KR | 10-1093721 B1 | 12/2011 |
| KR | 10-2012-0002366 A | 1/2012 |
| KR | 10-1127952 B1 | 3/2012 |
| KR | 10-1150719 B1 | 6/2012 |
| KR | 10-1168073 B1 | 7/2012 |
| KR | 10-2012-0136597 A | 12/2012 |
| KR | 10-1295325 B1 | 8/2013 |
| TW | 200907401 A | 2/2009 |
| TW | 201041985 A | 12/2010 |
| TW | 201105694 A | 2/2011 |
| TW | 201130880 A | 9/2011 |
| TW | 201202403 A | 1/2012 |
| TW | I357922 B | 2/2012 |
| WO | 2007-081186 A1 | 7/2007 |

(56) References Cited

FOREIGN PATENT DOCUMENTS

| WO | 2007-1211102 A1 | 10/2007 |
| WO | WO 2008-098872 A1 | 8/2008 |
| WO | 2011-013611 A | 2/2011 |

OTHER PUBLICATIONS

Search Report issued in International Application No. PCT/KR2013/004804 dated Aug. 19, 2013, 5 pages.
Search Report issued in International Application No. PCT/KR2013/004805 dated Aug. 22, 2013, 5 pages.
Search Report issued in International Application No. PCT/KR2013/004798 dated Aug. 28, 2013, 6 pages.
Search Report issued in International Application No. PCT/KR2013/004807 dated Sep. 4, 2013, 7 pgs.
Search Report issued in International Application No. PCT/KR2013/004812, dated Sep. 12, 2013, 6 pages.
Extended European Search Report dated Dec. 17, 2015, issued in European Patent Application No. 13797819.3, 12 pages.
Extended European Search Report dated Dec. 17, 2015, issued in European Patent Application No. 13797572.8, 10 pages.
Extended European Search Report dated Jan. 8, 2016, issued in European Patent Application No. 13796271.8, 7 pages.
Extended European Search Report dated Jan. 29, 2016, issued in European Patent Application No. 13830624.6, 9 pages.
Extended European Search Report dated Dec. 22, 2015, issued in European Patent Application No. 13798019.9, 9 pages.
Extended European Search Report dated Jan. 8, 2016, issued in European Patent Application No. 13798121.3, 6 pages.
Extended European Search Report dated Jan. 8, 2016, issued in European Patent Application No. 13798100.7, 7 pages.
Extended European Search Report dated Mar. 11, 2016, issued in European Patent Application No. 13830272.4, 7 pages.
Extended European Search Report dated Mar. 14, 2016, issued in European Patent Application No. 13830709.5, 9 pages.
Extended European Search Report dated Mar. 15, 2016, issued in European Patent Application No. 13830681.6, 10 pages.
Extended European Search Report dated Apr. 4, 2016, issued in European Patent Application No. 13830724.4, 11 pages.
Extended European Search Report dated Apr. 6, 2016, issued in European Patent Application No. 13831327.5, 8 pages.

\* cited by examiner

HARD COATING COMPOSITION

CROSS REFERENCE TO RELATED APPLICATIONS

This application is a 35 U.S.C. §371 National Phase Entry Application from PCT/KR2013/004809, filed May 31, 2013, and designating the United States, which claims priority under 35 U.S.C. §119 to Korean Patent Application No. 10-2012-0058634, filed on May 31, 2012, Korean Patent Application No. 10-2012-0058635, filed on May 31, 2012, Korean Patent Application No. 10-2012-0058636, filed on May 31, 2012, Korean Patent Application No. 10-2012-0058637, filed on May 31, 2012, and to Korean Patent Application No. 10-2013-0062094, filed on May 30, 2013, which are incorporated herein by reference in their entireties.

TECHNICAL FIELD

The present invention relates to a hard coating composition, and, more particularly, to a hard coating composition that can be used in forming a hard coating film exhibiting high hardness and excellent properties.

This application claims the benefits of Korean Patent Application Nos. 10-2012-0058634, filed on May 31, 2012, 10-2012-0058635, filed on May 31, 2012, 10-2012-0058636, filed on May 31, 2012, 10-2012-0058637, filed on May 31, 2012, and 10-2013-0062094, filed on May 30, 2013. The entire disclosures of the prior applications are hereby incorporated by references herein in its entirety into this application.

BACKGROUND ART

Recently, with the advance of mobile appliances such as smart phones, tablet PCs and the like, substrates for displays have been required to become thin or slim. Display windows or front panels of such mobile appliances are generally made of glass or reinforced glass which is a material having excellent mechanical properties. However, glass materials suffer from the disadvantage of making the mobile appliances heavy due to their own weight and being apt to be broken by external impacts.

As an alternative to glass, plastic resin films have been researched. A plastic resin film is suitable for the trend of pursuing lighter and slimmer mobile appliances because it is lightweight and does not easily break. Particularly, in order to obtain a film having high hardness and wear resistance, there is proposed a hard coating composition that is used in forming a hard coating layer on a substrate.

As a method of improving the surface hardness of a hard coating layer, a method of increasing the thickness of the hard coating layer may be considered. In order to ensure the surface hardness of the hard coating layer to such a degree that glass can be replaced by the hard coating layer, it is necessary to adjust the thickness of the hard coating layer. However, as the thickness of the hard coating layer increases, the surface hardness thereof may become higher, whereas the hard coating layer may be wrinkled or curled due to the curing shrinkage thereof and may be easily cracked or exfoliated. Therefore, it is not easy to put the hard coating layer to practical use.

Recently, there haven been proposed several methods of increasing the hardness of a hard coating film and solving the problem of the hard coating film being cracked or curled by the curing shrinkage thereof.

Korean Patent Application Publication No. 2010-0041992 discloses a hard coating film composition, free of monomers, using a binder resin including ultraviolet-curable polyurethane acrylate oligomers. However, this hard coating film has a pencil hardness of about 3H, which is not sufficient to alternate glass panels for displays.

DISCLOSURE

Technical Problem

Accordingly, the present invention has been devised to solve the above-mentioned problems, and an object of the present invention is to provide a hard coating composition that can be used in forming a hard coating film exhibiting high hardness and not being curled, warped or cracked.

Technical Solution

In order to accomplish the above object, an aspect of the present invention provides a hard coating composition, including: a binder containing a tri- to hexa-functional acrylate-based monomer; inorganic particles; a photoinitiator; and an organic solvent, wherein a solid content includes the binder, the inorganic particles and the photoinitiator, and a weight ratio of the solid content to the organic solvent is 70:30 to 99:1.

Another aspect of the present invention provides a solvent-free hard coating composition, including: a binder containing a tri- to hexa-functional acrylate-based monomer; inorganic particles; and a photoinitiator.

Advantageous Effects

The hard coating composition can be used to prepare a hard coating film that can be usefully applied to front panels or display panels of mobile appliances, display devices, instruments and the like because this hard coating film exhibits high hardness, high scratch resistance and high transparency and is not easily curled or cracked due to its high workability.

BEST MODE FOR CARRYING OUT THE INVENTION

In accordance with an aspect thereof, the present invention provides a hard coating composition, including: a binder containing a tri- to hexa-functional acrylate-based monomer; inorganic particles; a photoinitiator; and an organic solvent, wherein a solid content includes the binder, the inorganic particles and the photoinitiator, and a weight ratio of the solid content to the organic solvent is 70:30 to 99:1.

In accordance with another aspect thereof, the present invention provides a solvent-free hard coating composition, including: a binder containing a tri- to hexa-functional acrylate-based monomer; inorganic particles; and a photoinitiator.

In the present invention, the terms "first", "second" and the like are used to describe various constituents, only for the purpose of differentiating one constituent from another.

Further, the terms used in the present specification are used only to illustrate the present invention, and do not intend to limit the present invention. The singular number includes the plural number as long as they are apparently different from each other in context. In the present specification, the terms "include", "comprise", "have" and the like designate the existence of features, steps, constituents and combinations thereof, and must be understood that existence or addition of one or more other features, steps, constituents and combinations thereof is not previously excluded.

Further, in the present invention, when it is mentioned that each constituent is formed "on", "over" or "above" each constituent, it means that each constituent is directly formed on each constituent or that another constituent is additionally formed between layers, on an object or on a substrate.

Since the present invention may be modified in various forms, preferred embodiments of the present invention will be described in detail. Although these embodiments have been disclosed for illustrative purposes, it will be appreciated that the present invention is not limited thereto, and those skilled in the art will appreciate that various modifications, additions and substitutions are possible, without departing from the scope and spirit of the invention.

Hereinafter, preferred embodiments of the present invention will be described in detail.

A hard coating composition according to an embodiment of the present invention includes: a binder containing a tri- to hexa-functional acrylate-based monomer; inorganic particles; a photoinitiator; and an organic solvent, wherein a solid content includes the binder, the inorganic particles and the photoinitiator, and a weight ratio of the solid content to the organic solvent is 70:30 to 99:1.

In the present specification, the term "acrylate-based" is intended to encompass acrylate, methacrylate, and derivatives thereof with various substituents.

Examples of the tri- to hexa-functional acrylate-based monomers may include trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. The tri- to hexa-functional acrylate-based monomers may be used independently or in a combination thereof.

According to an embodiment of the present invention, the binder may further include a mono- to di-functional acrylate-based monomer.

Examples of the mono- to di-functional acrylate-based monomers may include hydroxyethyl acrylate (HEA), hydroxyethyl methacrylate (HEMA), hexanediol diacrylate (HDDA), tripropyleneglycol diacrylate (TPGDA), ethyleneglycol diacrylate (EGDA), and the like. The mono- to di-functional acrylate-based monomers may also be used independently or in a combination thereof.

According to an embodiment of the present invention, the binder may be included in an amount of about 35 to about 85 parts by weight or about 45 to about 80 parts by weight, based on 100 parts by weight of the solid content including the binder, inorganic particles and photoinitiator. When the amount of the binder is present in the above range, a high-hardness hard coating film, reducing the occurrence of curls or cracks due to its excellent workability, can be formed.

Further, when the binder further includes the mono- to di-functional acrylate-based monomers, the content ratio of the mono- to di-functional acrylate-based monomers to the tri- to hexa-functional acrylate-based monomers is not particularly limited. According to an embodiment of the present invention, mono- to di-functional acrylate-based monomers and tri- to hexa-functional acrylate-based monomers may be included such that the weight ratio thereof may be about 1:99 to about 50:50, about 10:90 to about 50:50, or about 20:80 to about 40:60. When mono- to di-functional acrylate-based monomers and tri- to hexa-functional acrylate-based monomers are included at the above weight ratio, the hard coating layer may be imparted with high hardness and flexibility without deteriorating other physical properties such as curl characteristics, light resistance and the like.

According to another embodiment of the present invention, the binder may further include a photocurable elastic polymer.

In the present specification, the photocurable elastic polymer refers to a polymer material which is elastic and contains a functional group that can be crosslink-polymerized by UV irradiation.

According to an embodiment of the present invention, the photocurable elastic polymer may have an elongation of about 15% or more, for example, about 15 to about 200%, about 20 to about 200%, or about 20 to about 150%, as measured according to ASTM D638.

When the hard coating composition of the present invention further includes a photocurable elastic polymer, the photocurable elastic polymer is crosslink-polymerized with the tri- to hexa-functional acrylate-based monomers and then cured to form a hard coating layer, which is improved in flexibility and impact resistance.

When the binder further includes a photocurable elastic polymer, the content ratio of the photocurable elastic polymer to the tri- to hexa-functional acrylate-based monomer is not particularly limited. However, according to an embodiment of the present invention, the photocurable elastic polymer and the tri- to hexa-functional acrylate-based monomer may be included such that the weight ratio thereof may be about 5:95 to about 20:80. When the photocurable elastic polymer and the tri- to hexa-functional acrylate-based monomer are included at the above weight ratio, the hard coating layer may be imparted with high hardness and flexibility without deteriorating other physical properties such as curl characteristics, light resistance and the like, and, particularly, it is possible to prevent the hard coating layer from being damaged by external impact, thus assuring excellent impact resistance.

According to an embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of polycaprolactone, a urethane acrylate-based polymer, and polyrotaxane.

Among the polymers used as the photocurable elastic polymer, polycaprolactone is formed by the ring-opening polymerization of caprolactone, and has excellent physical properties such as flexibility, impact resistance, durability and the like.

The urethane acrylate-based polymer retains urethane bonds to have excellent elasticity and durability.

The polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include polyrotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

In this case, the cyclic moiety (macrocycle) may be used without limitation as long as it has a size to such degree that it surrounds the thread moiety. The cyclic moiety (macrocycle) may include a functional group such as a hydroxide group, an amino group, a carboxyl group, a thiol group, an aldehyde group or the like, which can react with other polymers or compounds. Specific examples of the cyclic moiety (macrocycle) may include α-cyclodextrin, β-cyclodextrin, γ-cyclodextrin and mixtures thereof.

Further, the thread moiety may be used without limitation as long as it is generally linear in shape with a predetermined weight or greater. Preferably, a polyalkylene compound or a polylactone compound may be used in the thread moiety. Specifically, a polyoxyalkylene compound including an oxyalkylene repetitive unit of 1 to 8 carbon atoms or a polylactone compound including a lactone repetitive unit of 3 to 10 carbon atoms may be used in the thread moiety.

Meanwhile, the stopper may be appropriately adjusted depending on the characteristics of the rotaxane compound to be prepared. For example, the stopper may be at least one selected from the group consisting of a dinitrophenyl group, a cyclodextrin group, an adamantane group, a trityl group, a fluorescein group and a pyrene group.

Since the polyrotaxane has excellent scratch resistance, it can exhibit self-recovery ability when it is externally damaged and scratched.

The hard coating composition of the present invention includes inorganic particles. In this case, the inorganic particles may be included such that they are dispersed in the binder.

According to an embodiment of the present invention, as the inorganic particles, inorganic nanoparticles having a particle size of about 100 nm or less, about 10 to about 100 nm or about 10 to about 50 nm may be used. For example, silica particles, aluminum oxide particles, titanium oxide particles or zinc oxide particles may be used as the inorganic particles.

The hard coating composition includes the inorganic particles, thus further improving the hardness of a hard coating film.

According to an embodiment of the present invention, the inorganic particles may be included in an amount of about 10 to about 60 parts by weight or about 20 to about 50 parts by weight based on 100 parts by weight of the solid content including the binder, inorganic particles and photoinitiator. When the amount of the inorganic particles are present in the above range, the effect of improving the hardness of a hard coating film by the addition of inorganic particles can be attained without deteriorating the physical properties thereof.

The hard coating composition of the present invention includes a photoinitiator.

According to an embodiment of the present invention, examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, examples of commercially available photoinitiators may include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators may be used independently or in a mixture thereof.

According to an embodiment of the present invention, the photoinitiator may be included in an amount of about 0.5 to about 10 parts by weight or about 1 to about 5 parts by weight, based on 100 parts by weight of the solid content including the binder, inorganic particles and photoinitiator. When the amount of the photoinitiator is present in the above range, crosslink-photopolymerization can be sufficiently conducted without deteriorating the physical properties of a hard coating film.

Meanwhile, the hard coating composition of the present invention may further include commonly-used additives such as a surfactant, a yellowing inhibitor, a leveling agent, an antifouling agent and the like in addition to the above-mentioned binder, inorganic particles and photinitiator. Here, the content of the additive is not particularly limited because the content thereof may be variously adjusted while not deteriorating the physical properties of the hard coating composition. For example, the additive may be included in an amount of about 0.1 to about 10 parts by weight, based on 100 parts by weight of the solid content.

According to an embodiment of the present invention, for example, the hard coating composition may include a surfactant as an additive. The surfactant may be a mono- to di-functional fluorine-based acrylate, a fluorine-based surfactant or a silicon-based surfactant. In this case, the surfactant may be included in the form of it being dispersed in or crosslinked with the photocurable crosslinked copolymer.

Further, the hard coating composition may include a yellowing inhibitor as an additive. The yellowing inhibitor may be a benzophenone compound or a benzotriazole compound.

The hard coating composition of the present invention includes an organic solvent.

In the hard coating composition according to an embodiment of the present invention, the organic solvent may be included such that the weight ratio of solid content: the organic solvent is about 70:30 to about 99:1, the solid content including the binder, inorganic particle and photoinitiator. As described above, when the solid content thereof is high, a high-viscosity composition is obtained, and thus thick coating can be performed, thereby forming a thick hard coating layer having a thickness of 50 μm or more.

According to an embodiment of the present invention, examples of the organic solvent may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglyco monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used independently or in a mixture thereof.

According to an embodiment of the present invention, the viscosity of the hard coating composition is not particularly limited as long as it has suitable fluidity and coatability, but the hard coating composition can exhibit high viscosity because it has a relatively high solid content. For example, the hard coating composition may have a viscosity of about 100 to about 1,200 cps, about 150 to about 1,200 cps, or about 300 to about 1,200 cps at 25° C.

Further, the present invention provides a solvent-free hard coating composition, including: a binder containing a tri- to hexa-functional acrylate-based monomer; inorganic particles; and a photoinitiator.

According to an embodiment of the present invention, the binder may further include a mono- to di-functional acrylate-based monomer or a photocurable elastic polymer.

Detailed description of the tri- to hexa-functional acrylate-based monomer, mono- to di-functional acrylate-based monomer, photocurable elastic polymer, inorganic particles, photoinitiator, additive and the like of the solvent-free hard coating composition was aforementioned in the solvent-containing hard coating composition. However, the solvent-free hard coating composition can exhibit higher viscosity than the solvent-containing hard coating composition because it does not include an organic solvent. For example, the hard coating composition of the present invention may have a viscosity of about 300 to about 1,200 cps, about 500 to about 1,200 cps or about 800 to about 1,200 cps at 25° C.

The solvent-containing or solvent-free hard coating composition including the above-mentioned components is applied onto a supporting substrate and then photocured to form a hard coating layer.

Particularly, in order to use a hard coating film in covers for mobile terminals such as smart phones or covers for tablet PCs, it is important that the hardness of a hard coating film is improved to such a degree that the hard coating film replaces glass. In this case, in order to improve the hardness of the hard coating film, basically, the thickness of a hard coating layer must be increased to predetermined thickness, for example, 50 μm or more, 70 μm or more, or 100 μm or more. However, as the thickness of the hard coating layer is increased, the curl phenomenon caused by curing shrinkage is also increased, so the adhesion of the hard coating layer to the supporting substrate is decreased, and the hard coating film is easily rolled up. For this reason, a process of flattening the supporting substrate may be additionally performed, but this process is problematic in that the hard coating layer is cracked.

The hard coating composition may be used to form a hard coating layer having high transparency and high hardness because curls or cracks are not easily formed even when it is thickly applied onto a supporting substrate and cured. For example, a hard coating layer having a thickness of about 50 μm or more, about 50 to about 150 μm, or about 70 to about 100 μm can be formed using the hard coating composition of the present invention.

When a hard coating layer is formed using the hard coating composition of the present invention, the hard coating layer may be formed by a method commonly used in the related field.

For example, first, the hard coating composition of the present invention is applied onto one side of a supporting substrate. In this case, the method of applying the hard coating composition is not particularly limited as long as it can be used in the related field. For example, the hard coating composition may be applied by bar coating, knife coating, roll coating, blade coating, die coating, micro-gravure coating, comma coating, slot die coating, lip coating, solution casting or the like.

After the hard coating composition is applied, the procedure of stabilizing the surface of the applied hard coating composition may be selectively performed. This procedure may be performed by heat-treating the supporting substrate coated with the hard coating composition at predetermined temperature. Thus, the surface of the applied hard coating composition is flattened, and volatile components included in the hard coating composition are volatilized, thus stabilizing the surface thereof.

Next, the hard coating composition applied on the supporting substrate is irradiated with ultraviolet to photocure the hard coating composition, thus forming a hard coating layer.

When hard coating layers are formed on both sides of a supporting substrate using the hard coating composition of the present invention, first, a first hard coating composition is applied onto one side of a supporting substrate and photocured, and then a second hard coating composition is applied onto the other side thereof and photocured. That is, hard coating layers may be formed by a two-step process.

In the second photocuring step, the irradiation of ultraviolet is conducted from a side opposite to the side of the supporting substrate coated with the first hard coating composition, and thus curls formed due to the curing contraction in the first photocuring step are set off in a direction opposite to the first hard coating composition, thus obtaining a flat hard coating film. Therefore, an additional flattening procedure is not needed.

When the hard coating film including the hard coating layer formed using the hard coating composition of the present invention is exposed to a temperature of 50° C. or more and a humidity of 80% or more for 70 hours or more and then placed on a plane, the maximum distance at which each edge of the hard coating film is spaced apart from the plane may be about 1.0 mm or less, about 0.6 mm or less or about 0.3 mm or less. More specifically, when the hard coating film is exposed to a temperature of 50 to 90° C. and a humidity of 80 to 90% for 70 to 100 hours or more and then placed on a plane, the maximum distance at which each edge of the hard coating film is spaced apart from the plane may be about 1.0 mm or less, about 0.6 mm or less or about 0.3 mm or less.

The hard coating film including the hard coating layer formed using the hard coating composition of the present invention can be usefully used in various fields because it exhibits high hardness, scratch resistance, transparency, durability, light resistance and light transmission.

For example, the hard coating film including the hard coating layer formed using the hard coating composition of the present invention may have a pencil hardness of 7H or more, 8H or more or 9H or more under a load of 1 kg.

Further, when a friction tester is mounted with a steel wool #0000 and then the steel wool #0000 is reciprocated on the hard coating film of the present invention 400 times under a load of 500 g, two or less scratches may be formed on the hard coating film.

Further, the hard coating film including the hard coating layer formed using the hard coating composition of the present invention may have a light transmittance of 91.0% or more or 92.0% or more and a haze of 1.0% or less, 0.5% or less or 0.4% or less.

Further, the hard coating film including the hard coating layer formed using the hard coating composition of the present invention may have an initial color b* value of 1.0 or less. Further, when this hard coating film is exposed to UV-B for 72 hours or more by an ultraviolet lamp, the difference between the initial color b* value of the hard coating film and the color b* value of the hard coating film exposed to UV-B may be 0.5 or less or 0.4 or less.

As described above, the hard coating film including the hard coating layer formed using the hard coating composition of the present invention can be used in various fields. For example, the hard coating film of the present invention can be used in touch panels of mobile terminals, smart phones or tablet PCs and covers of displays or devices.

Hereinafter, the present invention will be described in more detail with reference to the following Examples. However, these Examples are set forth to illustrate the present invention, and the scope of the present invention is not limited thereto.

EXAMPLES

Preparation Example 1

Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether and 315 g of methyl ethyl ketone. Then, the mixture was reacted at 70° C. for 5 hours to obtain polyrotaxane in which polylactone with an acrylate moiety conjugated to the end thereof acted as the macrocycle while cyclodextrin was positioned as the stopper.

The weight average molecular weight of the obtained polyrotaxane was 600,000 g/mol, and the elongation thereof was 20%, as measured according to ASTM D638.

Example 1

2 g of hydroxyethylacrylate (HEA), 8 g of a silica-dipentaerythritolhexacrylate (DPHA) composite (silica 3.2 g, DPHA 4.8 g) dispersed with silica nanoparticles having a particle size of 20~30 nm in an amount of 40 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition. A second hard coating film was also prepared in the same manner.

The first hard coating composition was applied onto one side of a PET supporting substrate having a size of 15 cm×20 cm and a thickness of 188 μm. Then, the PET supporting substrate coated with the first hard coating composition was irradiated with ultraviolet having a wavelength of 280~350 nm using a black light fluorescent lamp to photocure the first hard coating composition.

The second hard coating composition was applied onto the other side of the PET supporting substrate. Then, the PET supporting substrate coated with the second hard coating composition was irradiated with ultraviolet having a wavelength of 280~350 nm using a black light fluorescent lamp to photocure the second hard coating composition, thereby preparing a hard coating film. Here, the thickness of each of the first and second hard coating layers formed on both sides of the PET supporting substrate was 100 μm.

Example 2

A hard coating film was prepared in the same manner as in Example 1, except that 2 g of 9-ethyleneglycol diacrylate (9-EGDA) was used instead of 2 g of hydroxyethylacrylate (HEA).

Example 3

A hard coating film was prepared in the same manner as in Example 1, except that 2 g of hydroxyethylacrylate (HEA) and 8 g of a silica-trimethylolpropanetriacylate (TMPTA) composite (silica 4 g, TMPTA 4) dispersed with silica nanoparticles having a particle size of 20~30 nm in an amount of about 40 wt % were used instead of 2 g of hydroxyethylacrylate (HEA) and 8 g of a silica-dipentaerythritolhexacrylate (DPHA) composite.

Example 4

2 g of hydroxyethylacrylate (HEA), 8 g of a silica-dipentaerythritolhexacrylate (DPHA) composite (silica 3.2 g, DPHA 4.8 g) dispersed with silica nanoparticles having a particle size of 20~30 nm in an amount of about 40 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were dissolved in 2 g of methyl ethyl ketone (MEK) to prepare first and second hard coating compositions.

The first hard coating composition was applied onto one side of a PC/PMMA coextruded supporting substrate having a size of 15 cm×20 cm and a thickness of 180 μm. Thereafter, a hard coating film was prepared in the same manner as in Example 1.

Example 5

9 g of a silica-dipentaerythritolhexacrylate (DPHA) composite (silica 3.6 g, DPHA 5.4 g) dispersed with silica nanoparticles having a particle size of 20~30 nm in an amount of 40 wt %, 1 g of polyrotaxane of Preparation Example 1, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition. A second hard coating film was also prepared in the same manner.

The first and second hard coating compositions were applied onto both sides of a PET supporting substrate having a size of 15 cm×20 cm and a thickness of 188 μm by bar coating. Then, the supporting substrate coated on both sides thereof with the first and second hard coating compositions was passed between ultraviolet (UV) irradiators, each of which was mounted with a metal halide lamp emitting a wavelength of 290~320 nm and which were provided both over and under the supporting substrate, to photocure the hard coating composition, thereby forming hard coating layers on both sides of the supporting substrate.

The thickness of each of the first and second hard coating layers formed on both sides of the supporting substrate is 100 μm.

Example 6

A hard coating film was prepared in the same manner as in Example 1, except that 1 g of a urethane acrylate-based polymer (brand name: UA200PA, Shinnakamura Chemicals Corp., weight average molecular weight: 2,600 g/mol, elongation measured based on ASTM D638: 170%) was used instead of 1 g of polyrotaxane of Preparation Example 1.

Example 7

A hard coating film was prepared in the same manner as in Example 1, except that 1 g of a urethane acrylate-based polymer (brand name: UA340P, Shinnakamura Chemicals Corp., weight average molecular weight: 13,000 g/mol, elongation measured based on ASTM D638: 150%) was used instead of 1 g of polyrotaxane of Preparation Example 1.

Comparative Example 1

A hard coating film was prepared in the same manner as in Example 1, except that only 10 g of dipentaerythritolhexacrylate (DPHA) was used instead of hydroxyethylacrylate (HEA) and a silica-dipentaerythritolhexacrylate (DPHA) composite.

Comparative Examples 2 and 3

Hard coating films were prepared in the same manner as in Example 1, except that the components of first and second hard coating compositions were changed as given in Table 1 below.

The components and contents of the first and second hard coating compositions of Examples 1 to 7 and Comparative Examples 1 to 3 are summarized in Table 1 below.

TABLE 1

| No. | Monomers for binder | | Photo-curable elastic polymer (unit: g) | Inorganic particles (unit: g) | Solvent (unit: g) |
|---|---|---|---|---|---|
| | 3-6 functional acrylate | 1-2 functional acrylate | | | |
| Ex. 1 | DPHA 4.8 g | HEA 2 g | 0 | 3.2 | 0 |
| Ex. 2 | DPHA 4.8 g | 9-EGDA 2 g | 0 | 3.2 | 0 |
| Ex. 3 | TMPTA 4.5 g | HEA 1 g | 0 | 4.5 | 0 |
| Ex. 4 | DPHA 4.8 g | HEA 2 g | 0 | 3.2 | 2 |
| Ex. 5 | DPHA 5.4 g | 0 | polyrotaxane 1 g | 3.6 | 0 |
| Ex. 6 | DPHA 5.4 g | 0 | UA200PA 1 g | 3.6 | 0 |
| Ex. 7 | DPHA 5.4 g | 0 | UA340P 1 g | 3.6 | 0 |
| Comp. Ex. 1 | DPHA 10 g | 0 | 0 | 0 | 0 |
| Comp. Ex. 2 | DPHA 8 g | HEA 2 g | 0 | 0 | 0 |
| Comp. Ex. 3 | DPHA 5 g | HEA 5 g | 0 | 0 | 0 |

Test Example

<Measuring Method>

1) Pencil Hardness

Pencil hardness was evaluated according to the Japanese Standard JIS K5400. In this regard, a pencil hardness meter was reciprocated three times on each of the hard coating film under a load of 1.0 kg to determine the hardness at which no scratches were observed.

2) Scratch Resistance

After being loaded to a friction tester, a steel wool (#0000) was reciprocated 400 times on each of the hard coating films under a load of 0.5 kg, and scratches thus formed were counted. Evaluation was made of the scratch resistance of the films by marking ○ for two or less scratches, Δ for two to less than five scratches, and x for five or more scratches.

3) Curl Property

When a supporting substrate coated with a first hard coating composition was photocured, cut to a size of 10 cm×10 cm and then placed on a plane, the maximum distance at which each edge of the supporting substrate is spaced apart from the plane was measured.

4) Light Resistance

Differences in color b* value of the hard coating films were measured before and after exposure to UVB from UV lamp for 72 hours.

5) Transmittance and Haze

The transmittance and haze of the hard coating films were measured using a spectrophotometer (brand name: COH-400).

6) Curl Property to Temperature and Humidity

When each of the hard coating films was cut to a size of 10 cm×10 cm, stored in a chamber at a temperature of 85° C. and a humidity of 85% for 72 hours and then placed on a plane, the maximum distance at which each edge of the hard coating film was spaced apart the plane was measured.

7) Cylindrical Bending Test

Each of the hard coating films was wound on a cylindrical mandrel having a diameter of 3 cm, and then it was determined whether or not each of the hard coating film was cracked. IF each of the hard coating films was not cracked, it was evaluated as OK, and if it was cracked, it was evaluated as X.

8) Impact Resistance

The impact resistance of each of the hard coating films was evaluated by determining whether or not each of the hard coating films was cracked when 22 g of a steel ball was dropped thereon from a height of 40 cm. When each of the hard coating films was not cracked, it is indicated by OK, and when it was cracked, it is indicated by X.

The results of the physical properties measured in the hard coating films are summarized in Tables 2 and 3 below.

TABLE 2

| | Ex. 1 | Ex. 2 | Ex. 3 | Ex. 4 | Ex. 5 | Ex. 6 | Ex. 7 |
|---|---|---|---|---|---|---|---|
| Pencil hardness | 8H | 9H | 9H | 8H | 9H | 9H | 8H |
| Scratch resistance | ○ | ○ | ○ | ○ | ○ | ○ | ○ |
| Curl property | 15 mm | 18 mm | 13 mm | 13 mm | 15 mm | 10 mm | 12 mm |
| Light resistance | 0.20 | 0.22 | 0.15 | 0.20 | 0.20 | 0.25 | 0.21 |
| Transmittance | 92.2 | 92.3 | 92.4 | 92.5 | 92.0 | 92.3 | 91.8 |
| Haze | 0.4 | 0.4 | 0.3 | 0.2 | 0.3 | 0.2 | 0.3 |
| Bending test | OK | OK | OK | OK | OK | OK | OK |
| Curl property to temperature and humidity | 0.3 mm | 0.2 mm | 0.2 mm | 0.3 mm | 0.0 mm | 0.0 mm | 0.0 mm |
| Impact resistance | OK | OK | OK | OK | OK | OK | OK |

TABLE 3

| | Comp. Ex. 1 | Comp. Ex. 2 | Comp. Ex. 3 |
|---|---|---|---|
| Pencil hardness | 6H | 5H | 3H |
| Scratch resistance | ○ | Δ | X |
| Curl property | 22 mm | 10 mm | 13 mm |
| Light resistance | 0.25 | 0.21 | 0.16 |
| Transmittance | 92.0 | 91.7 | 92.1 |
| Haze | 0.5 | 0.4 | 0.4 |
| Bending test | X | OK | OK |
| Curl property to temperature and humidity | 0.5 mm | 0.4 mm | 0.3 mm |
| Impact resistance | X | OK | OK |

As given in Tables 2 and 3 above, it can be ascertained that all of the hard coating films prepared using the hard coating compositions of Examples 1 to 7 exhibit good physical properties.

The invention claimed is:

1. A hard coating composition, comprising:
   a binder containing a tri- to hexa-functional acrylate-based monomer;
   inorganic particles;
   a photoinitiator; and
   an organic solvent,
   wherein a solid content includes the binder, the inorganic particles and the photoinitiator, and a weight ratio of the solid content to the organic solvent is 70:30 to 99:1.

2. The hard coating composition of claim 1, wherein the tri- to hexa-functional acrylate-based monomer includes at least one selected from the group consisting of trimethylolpropane triacrylate (TMPTA), trimethylolpropaneethoxy triacrylate (TMPEOTA), glycerin-propoxylated triacrylate (GPTA), pentaerythritol tetraacrylate (PETA), and dipentaerythritol hexaacrylate (DPHA).

3. The hard coating composition of claim 1, wherein the binder further includes a mono- to di-functional acrylate-based monomer.

4. The hard coating composition of claim 3, wherein the binder includes the mono- to di-functional acrylate-based monomer and the tri- to hexa-functional acrylate-based monomer at a weight ratio of 1:99 to 50:50.

5. The hard coating composition of claim 3, wherein the mono- to di-functional acrylate-based monomer includes at least one selected from the group consisting of hydroxyethyl acrylate (HEA), hydroxyethyl methacrylate (HEMA), hexanediol diacrylate (HDDA), tripropyleneglycol diacrylate (TPGDA), and ethyleneglycol diacrylate (EGDA).

6. The hard coating composition of claim 1, wherein the binder further includes a photocurable elastic polymer.

7. The hard coating composition of claim 6, wherein the photocurable elastic polymer has an elongation of 15 to 200%, as measured according to ASTM D638.

8. The hard coating composition of claim 6, wherein the photocurable elastic polymer includes at least one selected from the group consisting of polycaprolactone, a urethane acrylate-based polymer, and polyrotaxane.

9. The hard coating composition of claim 8, wherein the polyrotaxane includes: a macrocycle in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

10. The hard coating composition of claim 1, wherein the inorganic particles are dispersed in the binder.

11. The hard coating composition of claim 1, wherein the inorganic particles have a particle size of 100 nm or less.

12. The hard coating composition of claim 1, wherein the inorganic particles include at least one selected from the group consisting of silica nanoparticles, aluminum oxide nanoparticles, titanium oxide nanoparticles and zinc oxide nanoparticles.

13. The hard coating composition of claim 1, further comprising an additive.

14. The hard coating composition of claim 13, wherein the additive includes at least one selected from the group consisting of a mono- to di-functional fluorine-based acrylate, a fluorine-based surfactant, and a silicon-based surfactant.

15. The hard coating composition of claim 13, wherein the additive includes a yellowing inhibitor including a benzophenone compound or a benzotriazole compound.

16. The hard coating composition of claim 1, wherein the hard coating composition comprises 35 to 85 parts by weight of the binder, 10 to 60 parts by weight of the inorganic particles and 0.5 to 10 parts by weight of the photoinitiator, based on 100 parts by weight of the solid content.

17. The hard coating composition of claim 1, wherein the hard coating composition has a viscosity of 100 to 1,200 cps at a temperature of 25° C.

* * * * *